(12) United States Patent
Lau et al.

(10) Patent No.: US 10,477,473 B2
(45) Date of Patent: Nov. 12, 2019

(54) METHOD AND SYSTEM FOR EDRX TIMER CONTROL

(71) Applicant: Verizon Patent and Licensing Inc., Arlington, VA (US)

(72) Inventors: Priscilla Lau, Fremont, CA (US); Suzann Hua, Walnut Creek, CA (US); Lily Zhu, Parsippany, NJ (US); Xin Wang, Morris Plains, NJ (US); Jeremy Nacer, Denville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 39 days.

(21) Appl. No.: 15/657,522

(22) Filed: Jul. 24, 2017

(65) Prior Publication Data

US 2019/0028966 A1    Jan. 24, 2019

(51) Int. Cl.
   *H04W 52/02* (2009.01)
   *H04W 8/08* (2009.01)
   *H04W 76/28* (2018.01)
   *H04W 88/02* (2009.01)
   *H04W 8/18* (2009.01)

(52) U.S. Cl.
   CPC ......... *H04W 52/0216* (2013.01); *H04W 8/08* (2013.01); *H04W 76/28* (2018.02); *H04W 8/18* (2013.01); *H04W 88/02* (2013.01)

(58) Field of Classification Search
   None
   See application file for complete search history.

(56) References Cited

U.S. PATENT DOCUMENTS

| | | | |
|---|---|---|---|
| 2012/0269117 A1* | 10/2012 | Hu | H04L 45/04 |
| | | | 370/328 |
| 2016/0295504 A1* | 10/2016 | Wang | H04W 52/02 |
| 2017/0048920 A1* | 2/2017 | Kim | H04W 4/70 |
| 2017/0374542 A1* | 12/2017 | Ryu | H04W 8/08 |
| 2018/0049156 A1* | 2/2018 | Laha | H04W 4/06 |
| 2018/0152978 A1* | 5/2018 | Jia | H04W 76/10 |
| 2018/0227981 A1* | 8/2018 | Fujishima | H04W 52/02 |
| 2018/0234917 A1* | 8/2018 | Kim | H04W 48/08 |
| 2018/0270188 A1* | 9/2018 | Kodaypak | H04L 51/38 |

* cited by examiner

*Primary Examiner* — Ayaz R Sheikh
*Assistant Examiner* — Tarell A Hampton

(57) ABSTRACT

A method, a device, and a non-transitory storage medium provide an eDRX service that may be implemented for idle mode and/or connected mode of an end device. A network device stores eDRX data as a part of subscription data. The network device may provide the eDRX data to another network device that manages eDRX for end devices. The eDRX data may indicate to use global default eDRX timer values, subscriber-based eDRX timer values, ranges of eDRX timer values, and single-valued eDRX timer values. Each type of eDRX timer value may be provisioned on a per end device basis, a per radio access technology type basis, and/or a per application type basis.

20 Claims, 8 Drawing Sheets

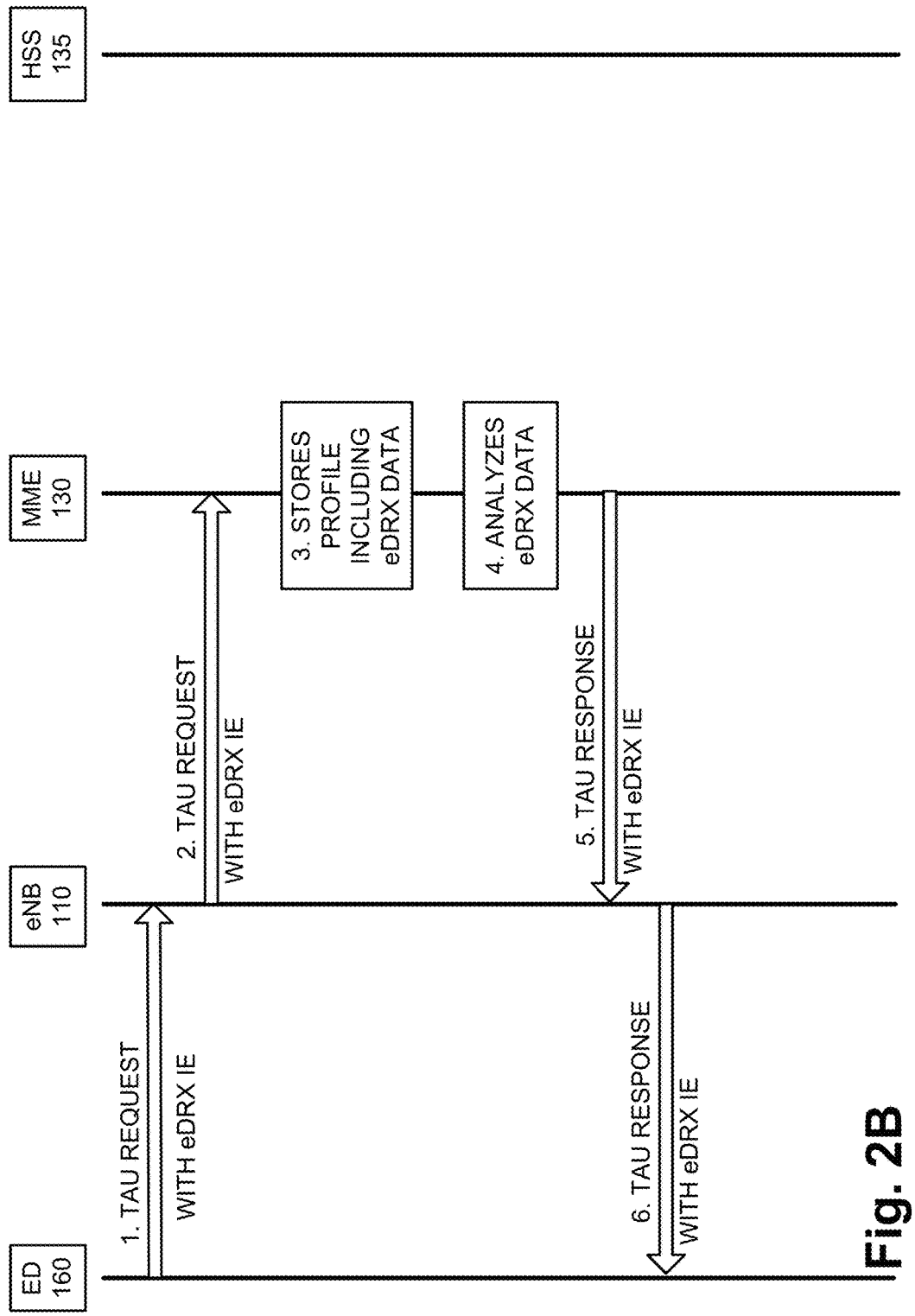

METHOD AND SYSTEM FOR EDRX TIMER CONTROL

BACKGROUND

Discontinuous reception (DRX) is a process of turning on and turning off a radio receiver according to a schedule that is coordinated between a wireless network and a wireless end device. In this way, the wireless device does not need to continuously monitor control channels for messages, and can reduce power consumption and extend battery life.

BRIEF DESCRIPTION OF THE DRAWINGS

FIG. 2B is a diagram illustrating an exemplary process of the eDRX service included in an exemplary tracking area update procedure;

DETAILED DESCRIPTION OF PREFERRED EMBODIMENTS

Figure 1:
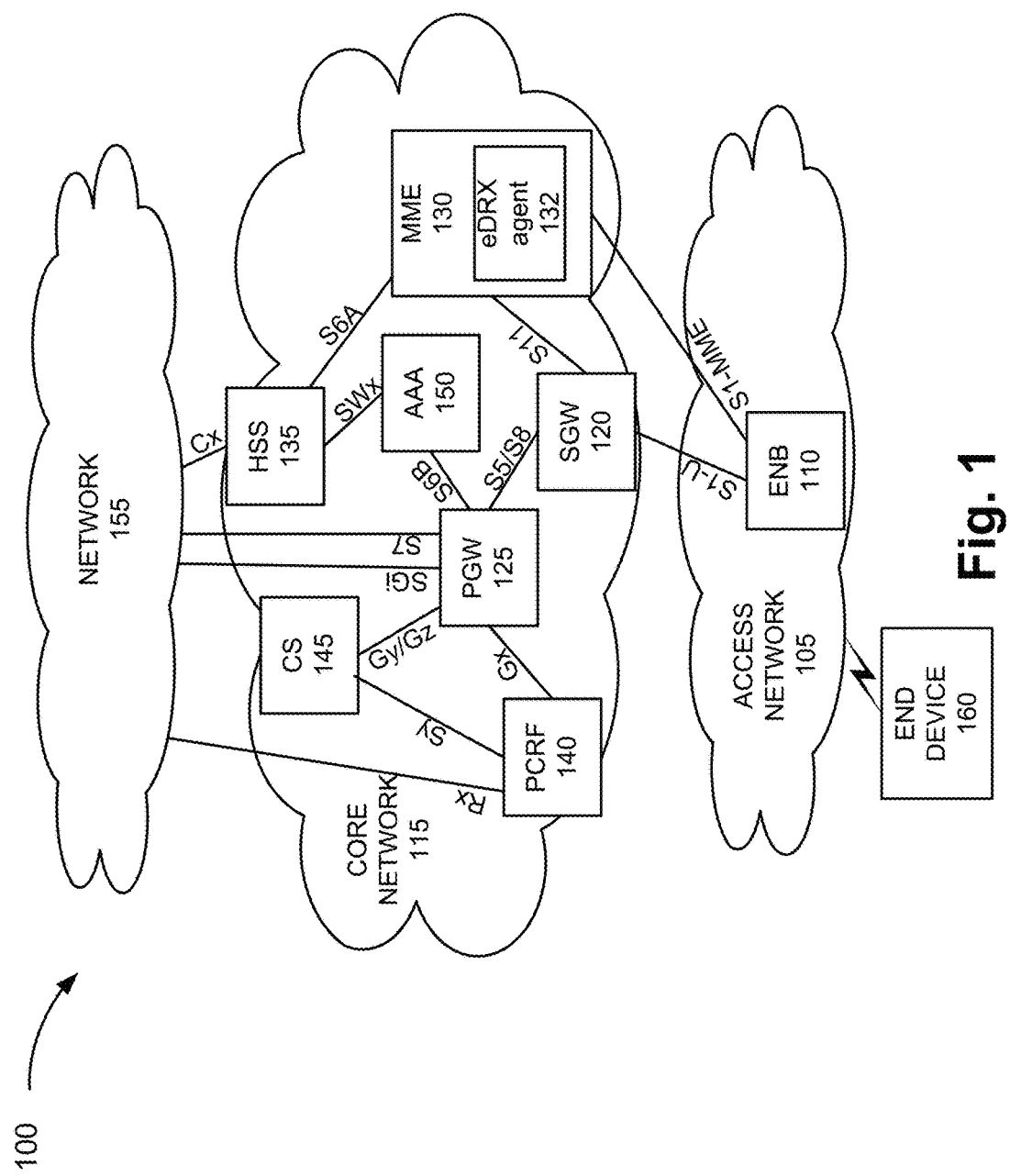
FIG. 1 is a diagram illustrating an exemplary environment in which an exemplary embodiment of an extended DRX (eDRX) service may be implemented.

The following detailed description refers to the accompanying drawings. The same reference numbers in different drawings may identify the same or similar elements. Also, the following detailed description does not limit the invention.

A wireless end device may use DRX to turn a radio receiver on and off according to a schedule that is coordinated between the wireless end device and a wireless network. In addition to DRX, an extended DRX (eDRX) process may be used to extend the turn-off period of the radio receiver of the wireless end device and further reduce the power consumption by the wireless end device, while also turning on the radio receiver to enable the wireless end device to receive messages via a wireless network. eDRX may be implemented for machine-to-machine (M2M) or Internet of Things (IoT) devices in which battery life can be particularly important, as well as other types of end devices that may need to infrequently communicate via the wireless network.

Current approaches to implementing DRX and eDRX, for example, in a Long Term Evolution (LTE) or an LTE-Advanced (LTE-A) context, do not specify how the mobility management entity (MME) supports effective and efficient network control of an eDRX timer value for user equipment (UE) while still allowing sufficient flexibility for the eDRX timer value among different UEs or for a given UE. Currently, eDRX timer values can be specified per radio access technology (RAT) type for each UE. This can result in overly restrictive eDRX timer control, especially for a UE that supports a variety of applications while using the same RAT. Also, this approach can result in excessive resource utilization because an eDRX timer value has to be provisioned for each RAT type of the UE, and such provisioning does not use global RAT eDRX timers.

According to exemplary embodiments, an eDRX service is described. According to exemplary embodiments, the eDRX service may be implemented for idle mode and/or connected mode of an end device. According to an exemplary embodiment, a network device stores eDRX data as a part of subscription data and/or end device profile data (referred to herein simply as "subscription data") pertaining to the management and communications with the end device. For example, the network device may be implemented as an HSS or other data repository device (e.g., a user profile server function (USPF), a home location register (HLR), an equipment identity register (EIR), a unified database management (UDM) device, etc.) that stores subscription data. According to an exemplary embodiment, the eDRX data is obtained and used by another network device to control eDRX with respect to the end device. For example, the other network device may be implemented as an MME, an Access and Mobility Management Function (AMF), a serving GPRS support node (SGSN), or other network device/element that is configured to manage eDRX with the end device.

According to an exemplary embodiment, the MME or other network device may obtain the eDRX data during an attachment procedure between the end device and a wireless network. The MME or other network device may store the eDRX data subsequent to the obtainment of the eDRX data. For example, the MME may obtain the eDRX data from the HSS during the attachment procedure, and may subsequently store the eDRX data.

According to an exemplary embodiment, the MME or other network device may provide an eDRX timer value to the end device for eDRX subsequent to the storage of the eDRX data. According to an exemplary embodiment, the MME or other network device may provide the eDRX timer value to the end device for eDRX during the attachment procedure and/or during other procedures that may occur subsequent to attachment. For example, the MME or other network device may provide the eDRX timer value to the end device during a tracking area update (TAU) procedure/ routing area update (RAU) procedure, or as a part (e.g., wholly or partially) of some other procedure that may occur subsequent to attachment.

According to exemplary embodiments, the eDRX data of subscribers may indicate various types of eDRX timer values to use. For example, the eDRX data may indicate to use global default eDRX timer values, subscriber-based eDRX timer values, ranges of eDRX timer values, and single-valued eDRX timer values. Each type of eDRX timer value (e.g., global default, subscriber-based, range of values, single value) may be provisioned on an individual basis (e.g., per end device), a per RAT type basis, and/or a per application type basis (e.g., per Access Point Name (APN)). According to an exemplary embodiment, the subscription data of an end device may include one of the types of eDRX data. For example, the eDRX data may indicate to use a global default timer value, a timer value within a range, a subscriber-based timer value, or a single timer value that is requested by the end device.

According to an exemplary embodiment, the eDRX data may indicate to use a global default eDRX timer. For example, the eDRX data may be implemented as a flag or other type of data that indicates the end device is to be provided with a global default eDRX timer. Global default eDRX timer values may be based on different types of end devices. For example, global default eDRX timer values may include eDRX timer values for Narrowband Internet of Things (NB-IoT) devices, another global default eDRX timer value for enhanced Machine Type Communication (eMTC) devices (also known as Cat-M1), and one or multiple other global default eDRX timer values for other categories/types of end devices (e.g., a category 1 or above LTE device, etc.). Additionally, or alternatively, the global default eDRX timer values may be based on different types of RATs. For example, global default eDRX timer values may include eDRX timer values corresponding to various RATs, such as Third Generation (3G), 3.5G, Fourth Generation (4G), 4.5G, Fifth Generation (5G), and so forth. Additionally, or alternatively, the global default eDRX timer values may be based on application types. For example, the global default eDRX timer values may include eDRX timer values corresponding to various types of applications (e.g., real-time, non-real-time, MTC application, non-MTC application, end user application, urgent (e.g., medical application), delay-tolerant, non-delay tolerant, etc.), or other types of nomenclatures directed to application types. Additionally, or alternatively, the global default eDRX timer values may include eDRX timer values that are some combination of the above. For example, the global default eDRX timer values may correspond to a combination of type of end device and application type, a combination of RAT type and application type, a combination of type of end device, RAT type, and application type, and so forth. In this way, the global default eDRX timer value may have a finer granularity corresponding to the capabilities and operation of the end device, and in turn, may improve operational (e.g., battery life, etc.) and communicative functionalities (e.g., transmission and reception of data) at the end device, and correspondingly improve wireless service.

According to an exemplary embodiment, the eDRX data may indicate to use eDRX timer values based on subscriber identifiers. The subscriber-based eDRX timer value may be based on the type of end device, the type of RAT, the type of application, or some combination thereof. The eDRX data may include an eDRX timer value. In this way, the network may reduce resource utilization by simply using the eDRX timer value indicated in the eDRX data, and the end device may be provided with an eDRX timer value that has been pre-configured for the end device in view of the functional and operational characteristics associated with the end device.

According to an exemplary embodiment, the eDRX data may indicate to use an eDRX timer value within a range of eDRX timer values. For example, the eDRX data may include a start eDRX timer value and an end eDRX timer value pertaining to eDRX. According to an exemplary implementation, the start eDRX timer value and the end eDRX timer value may each correspond to a standard eDRX timer value. For example, a standard eDRX timer value may be a value adopted by a governing entity (e.g., 3rd Generation Partnership Project (3GPP), International Telecommunication Union (ITU), etc.) in relation to a wireless network architecture (e.g., LTE, LTE-A, 5G, etc.) or a value disclosed in a technical specification. According to another exemplary implementation, the start eDRX timer value and/or the end eDRX timer value may not correspond to a standard eDRX timer value. In this way, the end device may be provided with a greater range of available eDRX timer values, and in turn, may improve operational (e.g., battery life, etc.) and communicative functionalities (e.g., transmission and reception of data) at the end device, and correspondingly improve wireless service. For example, the end device may request any eDRX timer value that falls within the start eDRX timer value and the end eDRX timer value for which various contexts related to RAT type, application type, may apply. The start eDRX timer value and the end eDRX timer value may be based on the type of end device, the type of RAT, the type of application, or some combination thereof.

According to an exemplary embodiment, the eDRX data may indicate to use a single eDRX timer value that is requested by the end device. For example, the eDRX data may be implemented as a flag or other type of data that indicates that the end device may request any eDRX timer value. The eDRX timer value may be a standard eDRX timer value or not. In this way, the end device may be provided with various eDRX timer values that are requested and correspond to a given context related to RAT type, application type, etc.

As a result of the foregoing, the eDRX service may offer greater versatility and control of eDRX timer values, which in turn may improve battery life for the end device, and may reduce network resource utilization.

FIG. 1 is a diagram illustrating an exemplary environment 100 in which an exemplary embodiment of the eDRX service may be implemented. As illustrated, environment 100 includes an access network 105, a core network 115, and a network 155. Access network 105 may be implemented to include an Evolved Universal Mobile Telecommunications System (UMTS) Terrestrial Radio Access Network (E-UTRAN) of an LTE network or an LTE-A network. According to such an implementation, access network 105 may include an evolved Node B (eNB 110). According to other exemplary implementations, access network 105 may be implemented to include a different RAN, such as a 3G RAN, a 3.5G RAN, or a future generation RAN (e.g., a 5G RAN). Depending on the implementation of access network 105, access network 105 may include other types of network devices, such as, for example, a base station (BS), a base transceiver station (BTS), a Node B, a remote radio head (RRH), an RRH and a baseband unit (BBU), a BBU, a wireless node (e.g., a small cell node (e.g., a picocell node, a femtocell node, a microcell node, etc.)), or other type of wireless station that provides wireless access to access network 105. Access network 105 may also include other types of networks, such as a WiFi network, a local area network (LAN), or other type of network that provides access to or can be used as an on-ramp to core network 115.

Core network 115 may be implemented to include an evolved packet core (EPC) of an LTE network or an LTE-A network. As illustrated, core network 115 may include, for example, a serving gateway (SGW) 120, a packet data network (PDN) gateway (PGW) 125, an MME 130, an HSS 135, a policy and charging rules function (PCRF) 140, a charging system (CS) 145, and an authentication, authorization, and accounting (AAA) server 150. According to other exemplary implementations, the EPC may include additional, fewer, and/or different network devices than those illustrated in FIG. 1. Additionally, according to still other exemplary implementations, core network 115 may be implemented to include a different core network, such as the core part of a 3G network, a 3.5G network, a future generation network, and so forth.

According to an exemplary embodiment, MME 130 includes an eDRX agent 132. eDRX agent 132 includes logic that provides the eDRX service, as described herein.

According to other exemplary embodiments, eDRX agent 132 may be implemented in a network device that is different from MME 130. For example, eDRX agent 132 may be implemented in some other network device included in access network 105, core network 115, or as a stand-alone network device. According to an exemplary embodiment, HSS 135 stores eDRX data, as described herein. For example, the eDRX data may be included in the subscription data of end device 160. In this regard, HSS 135 supports the provisioning and storing of the eDRX data. The Sha interface supports the communication of the eDRX data between HSS 135 and MME 130, as described herein. Additionally, for example, other interfaces (e.g., S1-MME, etc.) and network devices (e.g., eNB 110, etc.) may support the eDRX service, as described herein.

Network 155 includes one or multiple networks of one or multiple types. For example, network 155 may be implemented to provide an application and/or a service to end device 160. For example, network 155 may be implemented to include a service or application-layer network, the Internet, the World Wide Web, an Internet Protocol Multimedia Subsystem (IMS) network, a Rich Communication Service (RCS) network, a cloud network, a packet-switched network, a Public Switched Telephone Network (PSTN), a Signaling System No. 7 (SS7) network, a telephone network, a private network, a public network, a telecommunication network, an IP network, a wired network, a wireless network, or some combination thereof.

Environment 100 also includes an end device 160. End device 160 includes a device that has computational and wireless communication capabilities. End device 160 may be implemented as a mobile device, a portable device, or a stationary device. End device 160 may be implemented as a Machine Type Communication (MTC) device, an Internet of Things (IoT) device, an enhanced MTC device (eMTC) (also known as Cat-M1), a Narrowband-IoT (NB-IoT) device, a machine-to-machine (M2M) device, a user device, or some other type of wireless end node. According to various exemplary embodiments, end device 160 may be configured to execute various types of software (e.g., applications, programs, etc.). The number and the types of software may vary from one end device 160 to another end device 160.

As further illustrated, there are exemplary communication links and interfaces between the network elements. The number and arrangement of communication links illustrated in FIG. 1 are exemplary. Additionally, given the numerous protocols, standards, and proprietary frameworks that may be implemented, additionally and/or different interfaces may be used. Environment 100 may be implemented to include wired, optical, and/or wireless communication links among the devices and the networks illustrated. A communicative connection via a communication link may be direct or indirect. For example, an indirect communicative connection may involve an intermediary device and/or an intermediary network not illustrated in FIG. 1.

According to other embodiments, environment 100 may include additional networks, fewer networks, and/or different types of networks than those illustrated and described herein. Additionally, according to other exemplary embodiments, environment 100 may include additional devices, fewer devices, and/or different types of devices than those illustrated and described herein.

A device may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, a proxy device, and/or a cloud device).

Figure 2A:
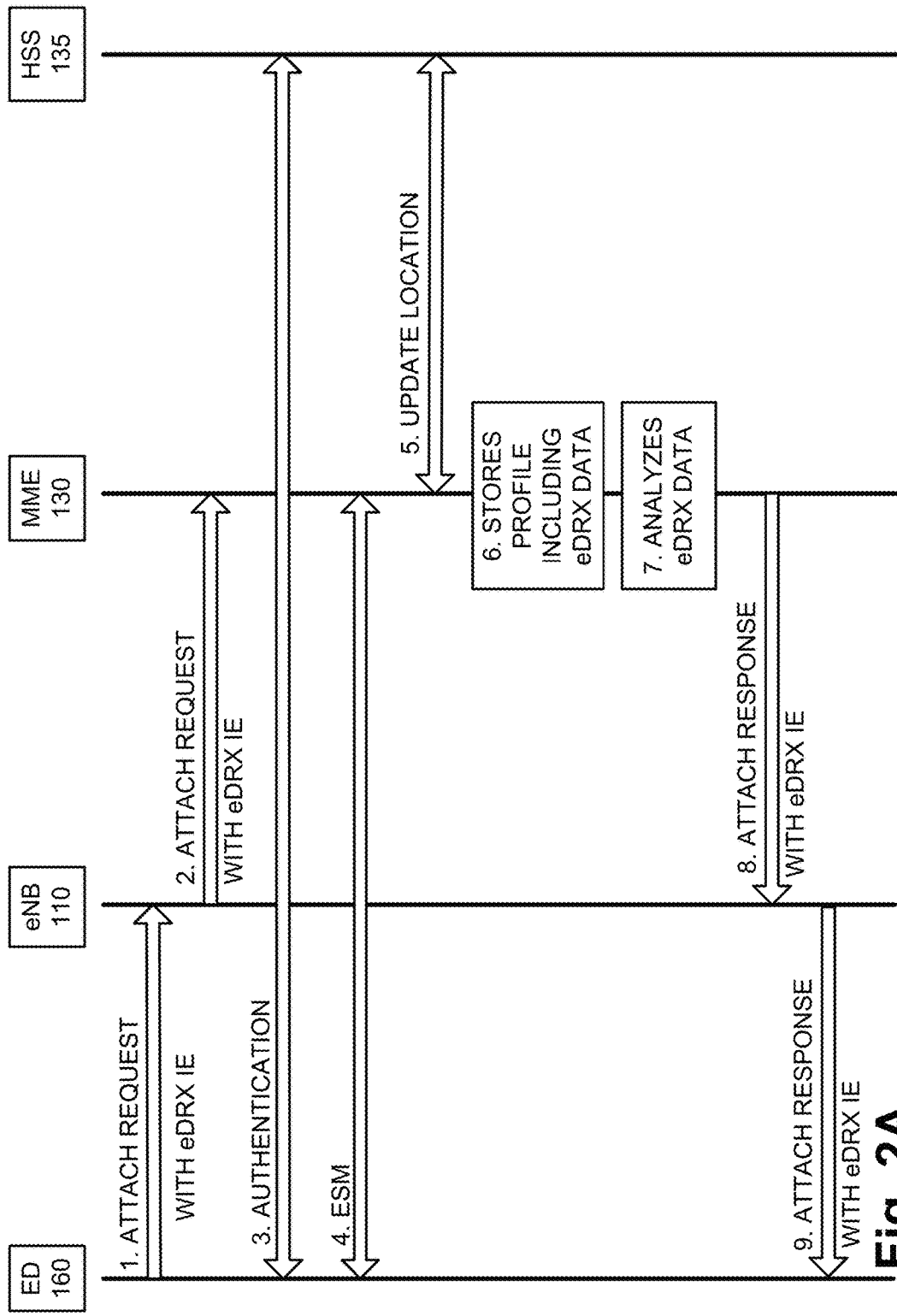
FIG. 2A is a diagram illustrating an exemplary process of the eDRX service included in an exemplary attachment procedure.

FIG. 2A is a diagram illustrating an exemplary process of the eDRX service included in an attachment procedure. The messages illustrated and described are exemplary, and do not represent each and every message that may be exchanged during the attachment procedure. For example, a random access procedure, which is not illustrated in FIG. 2A, may take place before a radio resource control (RRC) connection establishment procedure. Additionally, for example, various messages may be exchanged to establish a bearer connection. Also, a message may include other data (e.g., IEs, etc.) not specifically described herein Referring to FIG. 2A, end device 160 and eNB 110 exchange messages to establish an RRC connection during which end device 160 may transmit a non-access stratum (NAS) attach request (Attach Request), as illustrated by step (1). The Attach Request also includes eDRX information element (IE) for support of the eDRX service. The eDRX IE may include an eDRX timer value. In response to receiving the Attach Request with the eDRX IE, eNB 110 transmits an Attach Request, which includes the eDRX IE, to MME 130, as illustrated by step (2) (Attach Request). The Attach Request may include a Packet Data Network (PDN) Connectivity Request.

After an RRC connection is established, an authentication procedure begins, as illustrated in step (3). The authentication messaging may include an International Mobile Equipment Identity (IMEI) or other identifier of end device 160. Messages may be exchanged between MME 130 and HSS 135. Dependent on the result of the authentication procedure, MME 130 may determine whether or not to continue with the attachment procedure. According to this exemplary scenario, it may be assumed that MME 130 decides to continue with the attachment procedure.

As illustrated in step (4) (Evolved Packet System Session Management (ESM)), MME 130 and end device 160 may exchange messages (e.g., ESM Information Request/Response) for ESM information. Thereafter, MME 130 and HSS 135 may exchange messages (Update Location), as illustrated in step (5). For example, MME 130 may transmit an Update Location Request to HSS 135. In response to receiving the Update Location Request, HSS 135 performs a lookup for stored subscription data pertaining to end device 160. The subscription data includes eDRX data, as described herein.

Figure 3:
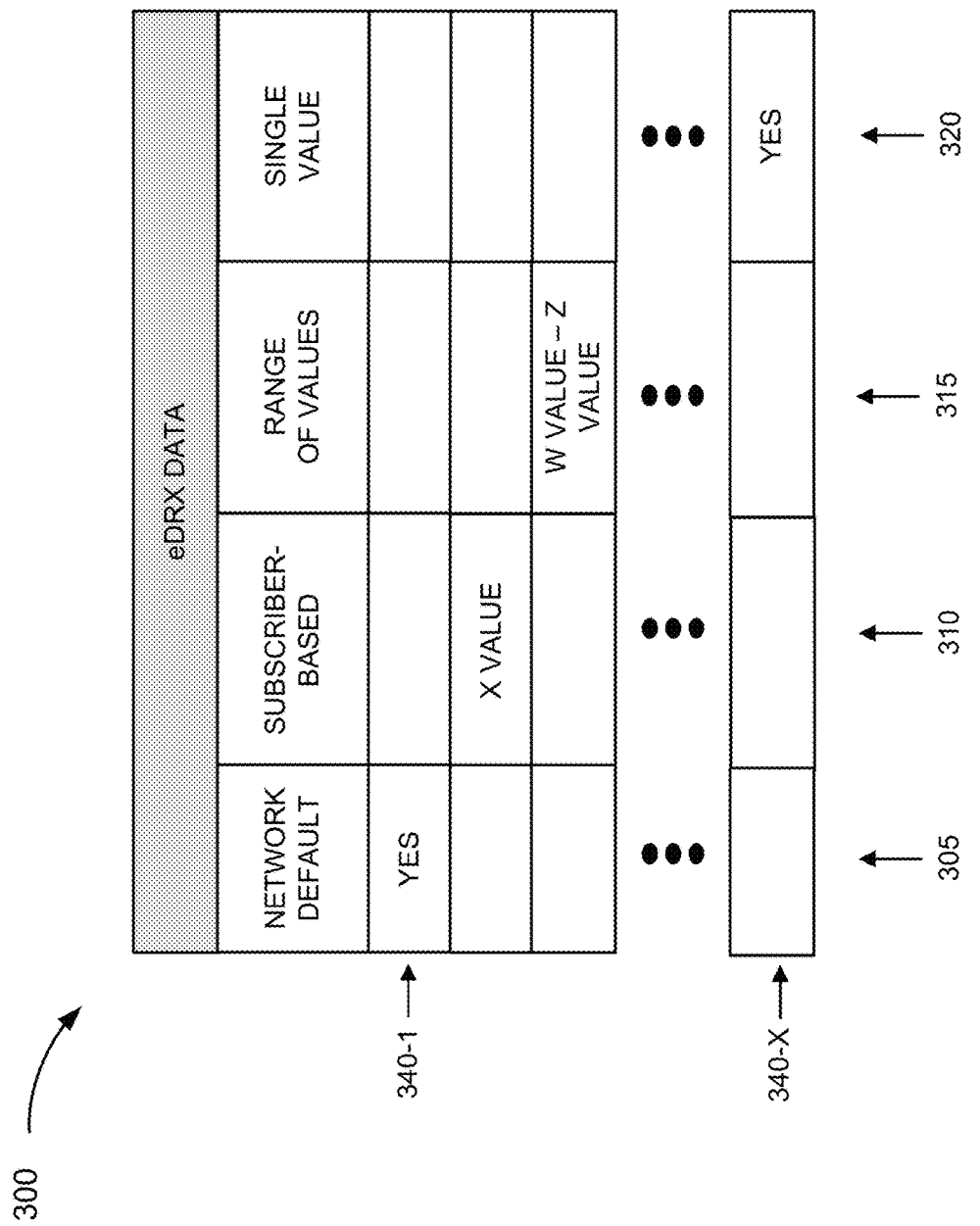
FIG. 3 is a diagram illustrating exemplary eDRX data used by the eDRX service.

Referring to FIG. 3, an exemplary table 300 is illustrated, which stores exemplary eDRX data. As illustrated, table 300 includes a network default field 305, a subscriber-based field 310, a range of values field 315, and a single value field 320. As further illustrated, table 300 includes records 340-1 through 340-X that each may be correlated to an identifier pertaining to a subscriber and/or an end device (not illustrated). Each record 340 may specify one instance of the eDRX data. The eDRX data is illustrated in tabular form merely for the sake of description. The eDRX data may be implemented in a data structure different from a table. According to other exemplary implementations, table 300 may store additional, fewer, and/or different instances of eDRX data. The representation of eDRX data illustrated in FIG. 3 is exemplary.

Network default field 305 may store data indicating to use a global default eDRX timer value. By way of example, as illustrated in network default field 305, the eDRX data may indicate (e.g., yes) to use a global default eDRX timer value.

The global default eDRX timer value may be based on a type of end device, a RAT type, and/or an application type.

Subscriber-based field 310 may store data indicating an eDRX timer value. The eDRX timer value may or may not be a standard value. As an example, the eDRX timer value may be a value that is negotiated between the service provider and the subscriber prior to use of network services by the end device (e.g., prior to a first attachment by the end device).

Range of values field 315 may store a range of eDRX timer values. For example, the range of eDRX timer values may include a start timer value and an end timer value. The start timer value may indicate a minimum timer value and the end timer value may indicate a maximum timer value. For example, the start timer value may be 1,310.72 seconds (or some other value) and the end timer value may be 10,485.76 seconds (or some other value). In this way, for example, an end device that supports multiple applications in which a single eDRX timer value would not be suitable for all the applications (e.g., given differences in communication characteristics, etc.), the end device may be afforded any eDRX timer value that falls within the stored range of eDRX timer values (e.g., X seconds-Y seconds). According to an exemplary implementation, the start range timer value and the end range timer value may each be a standard eDRX timer value. According to another exemplary implementation, the start timer value and/or the end range timer value may not be a standard eDRX timer value. A timer may be a simple interval timer, a timer based on a network clock, a global timer, an interval timer, an external timer, or other type of time mechanism.

Single value field 320 may store eDRX data that indicates to use a single eDRX timer value. By way of example, as illustrated in single value field 320, the eDRX data may indicate (e.g., yes) to use a single eDRX timer value. The single eDRX timer value may be requested by end device 160 and/or selected by MME 130, as described herein.

Referring back to FIG. 2A, in step (5), HSS 135 generates and transmits an Update Location Request Answer that carries the subscription data of end device 160. The subscription data includes eDRX data, as described herein. For example, the eDRX data may correspond to data indicated in one of fields 305, 310, 315, or 320 included in one of records 340. In response to receiving the Update Location Request Answer, MME 130 stores the subscription data, which includes the eDRX data (as illustrated in step (6)). In response to storing the eDRX data, in step (7), MME 130 analyzes the eDRX data. For example, MME 130 may determine the eDRX timer value to select and for end device 160 to use, based on the analysis of the eDRX data. For example, when the eDRX data indicates to use a global default eDRX timer value, MME 130 may determine and select the appropriate global default eDRX timer value. For example, MME 130 may determine and select a global default eDRX timer value based on the type of end device 160, the type of RAT associated with end device 160, and/or the type of application associated with end device 160. Alternatively, for example, when the eDRX data indicates a subscriber-based eDRX timer value, MME 130 may select the subscriber-based eDRX timer value included in the eDRX data. According to another example, when the eDRX data indicates a range of eDRX timer values, MME 130 may determine whether an eDRX timer value (e.g., included in the eDRX IE from end device 160) falls within the range of eDRX timer values included in the eDRX data, as described herein. According to yet another example, when the eDRX data indicates to use a single eDRX timer value, MME 130 may use the eDRX timer value requested by end device 160, as described herein.

According to an exemplary embodiment, end device 160 may include an eDRX timer value in the eDRX IE. According to one example, when the eDRX data indicates a range of eDRX timer values, MME 130 may verify that the requested eDRX timer value falls within the range of eDRX timer values included in the eDRX data of the subscription data. For example, when the requested eDRX timer value falls within the range included in the eDRX data, MME 130 may grant the requested eDRX timer value. However, when the requested eDRX timer value does not fall within the range included in the eDRX data, MME 130 may deny the requested eDRX timer value. Alternatively, MME 130 may change the requested eDRX timer value to an eDRX timer value that falls within the range included in the eDRX data. For example, MME 130 may select the eDRX timer value that is closest (numerically) to the requested eDRX timer value.

According to another example, when the eDRX data indicates to use a single value eDRX timer value, MME 130 may grant the request. For example, MME 130 may grant the requested eDRX timer value regardless of whether the eDRX timer value is a standard eDRX timer value or not. Alternatively, for example, MME 130 may verify that the requested eDRX timer value is a standard eDRX timer value. For example, MME 130 may store data indicating standard eDRX timer values. MME 130 may compare the requested eDRX timer value to the data. When the requested eDRX timer value is determined to be a standard eDRX timer value, MME 130 may grant the requested eDRX timer value. When the requested eDRX timer value is determined to be a non-standard eDRX timer value, MME 130 may deny the request. Alternatively, MME 130 may select a standard eDRX timer value that is closest (numerically) to the requested eDRX timer value based on the data.

In the event that MME 130 rejects a request from end device 160, a response transmitted from MME 130 to end device 160 may not include eDRX data. According to an exemplary implementation, MME 130 and end device 160 may use configuration data that supports DRX and not eDRX.

According to this exemplary scenario, in step (8), MME 130 generates and transmits an Attach Accept to eNB 110. The Attach Accept includes an eDRX IE that indicates the eDRX timer value selected in step (7). In step (9), in response to receiving the Attach Response, which includes the eDRX timer value, eNB 110 generates and transmits an Attach Response, which includes the eDRX timer value, to end device 160. End device 160 may use the eDRX timer value to configure eDRX.

While FIG. 2A illustrates exemplary messages and describes exemplary operations of the eDRX service that may occur during an attachment procedure, according to other embodiments and/or scenarios, the eDRX service may include messages and/or operations different from those illustrated and described in FIG. 2A.

FIG. 2B is a diagram illustrating another exemplary process of the eDRX service included in an exemplary tracking area update (TAU) procedure. The messages illustrated and described are exemplary, and do not represent each and every message that may be exchanged during the tracking area update procedure. Additionally, a message may include other data (e.g., IEs, etc.) not specifically described herein. According to this exemplary scenario, assume that a triggering event has occurred, subsequent to the attachment described in relation to FIG. 2A, which causes end device 160 to initiate a TAU procedure.

As illustrated in FIG. 2B, in step (1), end device 160 generates and transmits to eNB 110 a TAU request. The TAU request includes an eDRX IE. The eDRX IE may include an eDRX timer value. The TAU request may include a TAU IE.

In step (2), eNB 110 receives the TAU request, and in response, generates and transmits a TAU request that includes the eDRX IE. In step (3), assume that MME 130 continues to store the subscription data of end device 160, which includes the eDRX data, as previously described in relation to FIG. 2A. In step (4), in response to receiving the TAU request, MME 130 analyzes the eDRX data pertaining to end device 160. For example, MME 130 performs an operation similar to that previously described in relation to FIG. 2A. In step (5), MME 130 generates and transmits a TAU response, which includes an eDRX timer value, to eNB 110. In step (6), in response to receiving the TAU response, eNB 110 generates and transmits a TAU response, which includes the eDRX timer value, to end device 160. End device 160 may use the eDRX timer value to configure eDRX.

While FIG. 2B illustrates exemplary messages and describes exemplary operations of the eDRX service that may occur during a TAU procedure, according to other embodiments and/or scenarios, the eDRX service may include messages and/or operations different from those illustrated and described in FIG. 2B.

Figure 4:
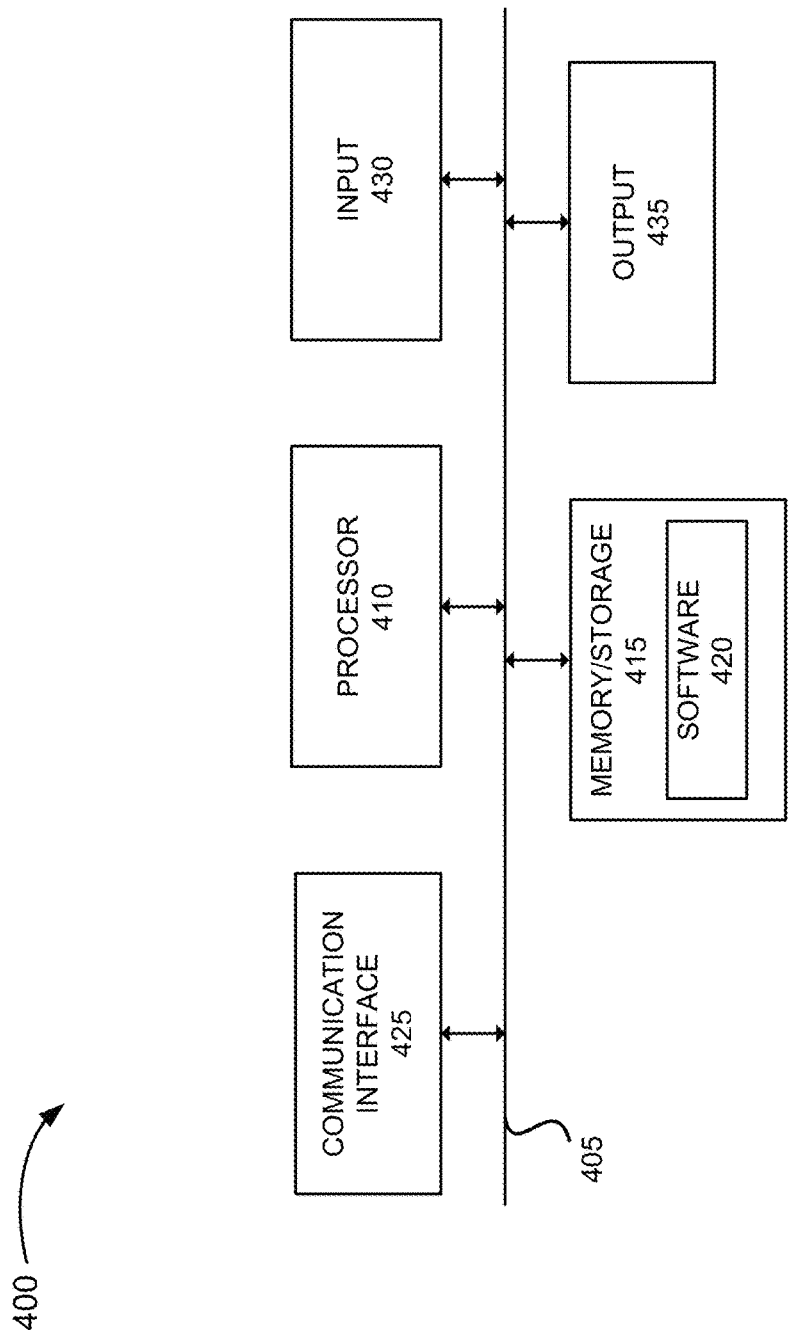
FIG. 4 is a diagram illustrating exemplary components of a device that may correspond to one or more of the devices illustrated herein.

FIG. 4 is a diagram illustrating exemplary components of a device 400 that may correspond to one or more of the devices described herein. For example, device 400 may correspond to components included in network devices of access network 105 and core network 115, and end device 160. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, graphical processing units (GPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to HSS 135, software 420 may include an application that, when executed by processor 410, provides the functions of the eDRX service, as described herein. Similarly, MME 130, end device 160, and other network devices may each include an application that, when executed by processor 410, provides the functions of the eDRX service, as described herein. Software 420 may also include firmware, middleware, microcode, hardware description language (HDL), and/or other form of instruction. Software 420 may further include an operating system (OS) (e.g., Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, etc.). Additionally, as previously described, in contrast to an existing configuration/standard of the S6a interface, the S6a interface as described herein supports the eDRX service. For example, the S6a interface provides for the communication of eDRX data from HSS 135 to MME 130. Further, other interfaces (e.g., S1-MME, etc.) may be contrasting to existing configurations/standards in view their support of the eDRX service, as described herein.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5:
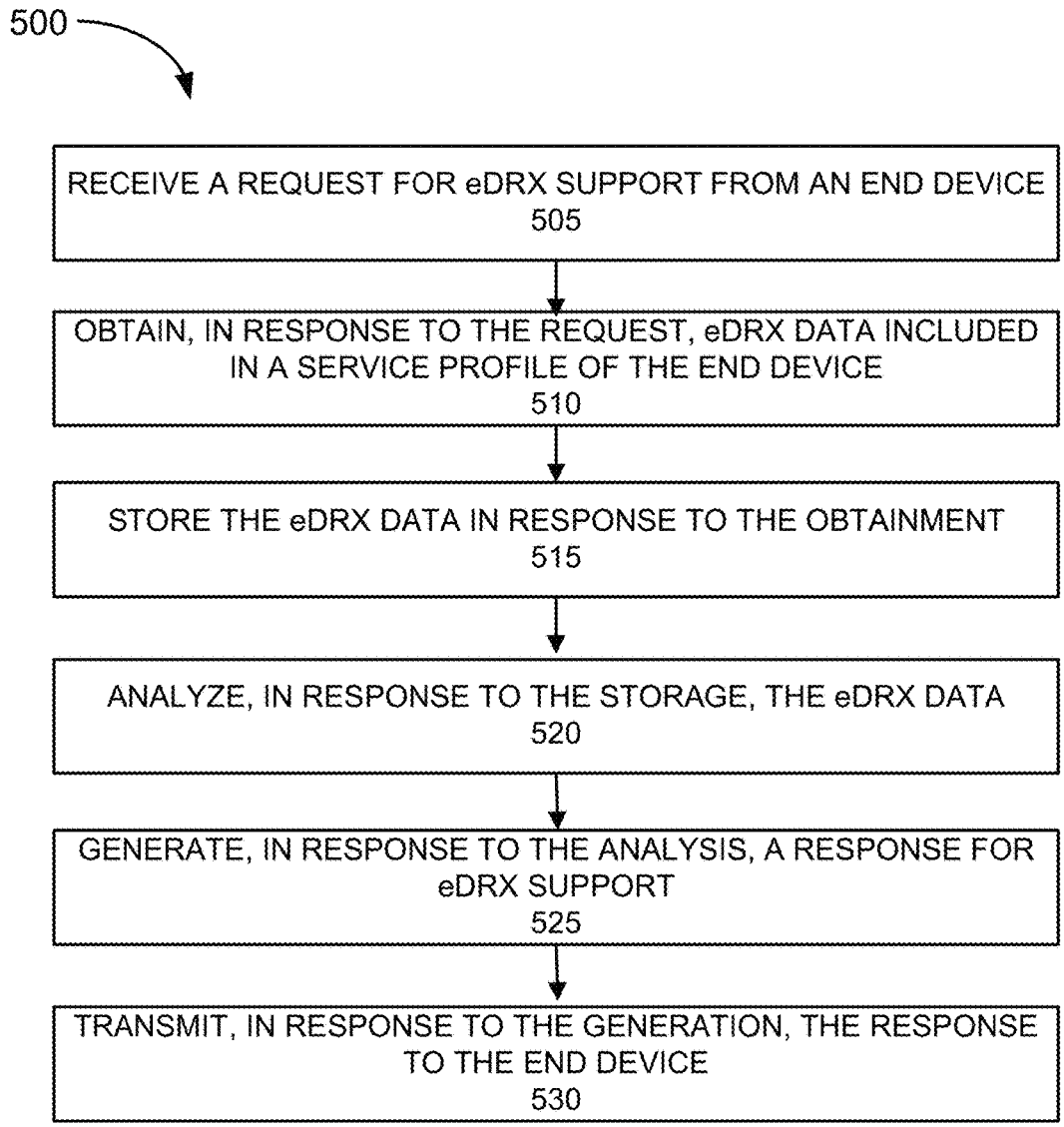
FIG. 5 is a flow diagram illustrating an exemplary process of an exemplary embodiment of the eDRX service.

FIG. 5 is a flow diagram illustrating an exemplary process 500 of an exemplary embodiment of the eDRX service. Process 500 is directed to the process previously described with respect to FIGS. 2A and 2B, as well as elsewhere in this description. According to an exemplary embodiment, MME 130 performs the steps of process 500. According to other exemplary embodiments, another type of network device (e.g., AMF, SGSN, etc.) that manages eDRX support for end device 160 performs the steps of process 500. According to an exemplary embodiment, processor 410 executes software 420 to perform the steps illustrated in FIG. 5, and described herein.

According to an exemplary embodiment, the network device described in process 500 is HSS 135. According to other exemplary embodiments, the network device is another type of network device (e.g., USPF, HLR, EIR, UDM device, etc.) that stores subscription data and/or end device profile data pertaining to an end device.

Referring to FIG. 5, block 505 of process 500, a request for eDRX support is received from an end device. For example, MME 130 receives an Attach request, a TAU request, a RAU request, or other type of request for eDRX support from end device 160.

In block 510, in response to receiving the request, eDRX data included in subscription data of the end device is obtained from a network device. For example, MME 130 transmits a request to HSS 135 for subscription data of end device 160. MME 130 receives the subscription data of end device 160 from HSS 135. The subscription data includes eDRX data, as described herein.

In block 515, in response to obtaining the eDRX data, the eDRX data is stored. For example, MME 130 stores the eDRX data included in the subscription data of end device 160.

In block 520, in response to the storage of the eDRX data, the eDRX data is analyzed. For example, MME 130 analyzes the eDRX data to determine an appropriate response to the request for eDRX support, as previously described. The appropriate response may include a global default eDRX timer value, a subscriber-based eDRX timer value, an eDRX timer value that is within a range of eDRX timer values, or a single eDRX timer value that is requested by end device 160. According to this exemplary scenario, assume that MME 130 does not determine that the appropriate response is a reject message or a fallback to DRX support.

In block 525, in response to the analysis of the eDRX data, a response for eDRX support is generated. For example, MME 130 generates a response for eDRX support that includes an eDRX timer value.

In block 530, in response to the generation, the response for eDRX support is transmitted to the end device. For example, MME 130 transmits the response for e DRX support to end device 160.

Although FIG. 5 illustrates an exemplary process of the eDRX service, according to other embodiments, process 500 may include additional operations, fewer operations, and/or different operations than those illustrated in FIG. 5, and described herein.

Figure 6:
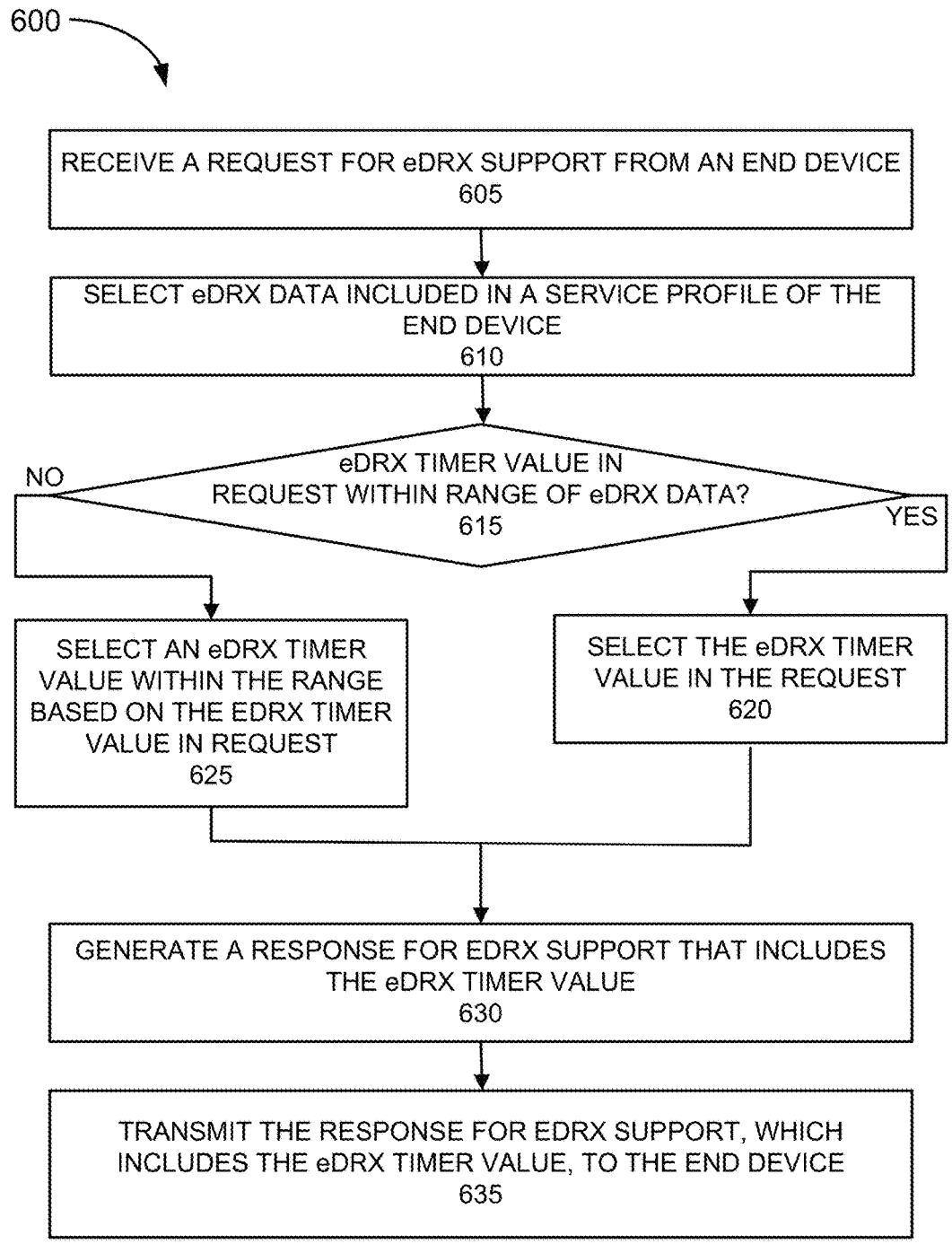
FIG. 6 is a flow diagram illustrating another exemplary process of an exemplary embodiment of the eDRX service.

FIG. 6 is a flow diagram illustrating another exemplary process 600 of an exemplary embodiment of the eDRX service. Process 600 is directed to the process previously described with respect to FIGS. 2A and 2B, as well as elsewhere in this description. According to an exemplary embodiment, MME 130 performs the steps of process 600. According to other exemplary embodiments, another type of network device (e.g., AMF, SGSN, etc.) that manages eDRX support for end device 160 performs the steps of process 600. According to an exemplary embodiment, processor 410 executes software 420 to perform the steps illustrated in FIG. 6, and described herein.

Referring to FIG. 6, in block 605, a request for eDRX support is received from an end device. For example, MME 130 receives an Attach request, a TAU request, a RAU request, or other type of request for eDRX support from end device 160. The request includes an eDRX timer value. For example, the request includes an eDRX IE, as previously described.

In block 610, in response to receiving the request, eDRX data, which is included in a service profile of the end device, is selected. For example, MME 130 selects the eDRX data that pertains to the end device 160. The eDRX data indicates a range of eDRX timer values.

In block 615, in response to the selection, it is determined whether the eDRX timer value included in the request is within the range of eDRX timer values. For example, MME 130 may compare the requested eDRX timer value to the range of eDRX timer values. When it is determined that the requested eDRX timer value is within the range of eDRX timer values (block 615—YES), the requested eDRX timer value included in the request is selected (block 620). For example, MME 130 may determine that the requested eDRX timer value falls within the range of eDRX timer values of the eDRX data. Process 600 may continue to block 630.

When it is determined that the requested eDRX timer value is not within the range of the eDRX timer values (615-NO), an eDRX timer value within the range of eDRX timer values is selected based on the requested eDRX timer value (block 625). For example, MME 130 may change the requested eDRX timer value included in the request to an eDRX timer value. As previously described, according to an exemplary embodiment, MME 130 may select an eDRX timer value that is closest (e.g., numerically) to the requested eDRX timer value. For example, MME 130 may select the start eDRX timer value or the end eDRX timer value. According to an exemplary implementation, MME 130 may calculate a difference value, which indicates the numerical difference between the requested eDRX timer value and an eDRX timer value of the eDRX data. When the difference value is greater than a threshold value, MME 130 may reject the request and fallback to DRX support. When the difference value is equal to or less than the threshold value, the closet eDRX timer value will be selected for use. According to another exemplary implementation, MME 130 may not calculate the difference value, and may select and use the closest standard eDRX timer value regardless of the numerical difference that may exist. Process 600 continues to block 625.

In block 630, a response for eDRX support, which includes the selected eDRX timer value, is generated. For example, MME 130 generates the response for eDRX support that includes the selected eDRX timer value. The selected eDRX timer value may have been included in the request or calculated by MME 130.

In block 630, the response for eDRX support, which includes the selected eDRX timer value, is transmitted. For example, MME 130 transmits the response for eDRX support to end device 160.

Although FIG. 6 illustrates an exemplary process of the eDRX service, according to other embodiments, process 600 may include additional operations, fewer operations, and/or different operations than those illustrated in FIG. 6, and described herein. For example, when MME 130 generates a rejection response to end device 160, the response does not include an eDRX timer value.

Figure 7:
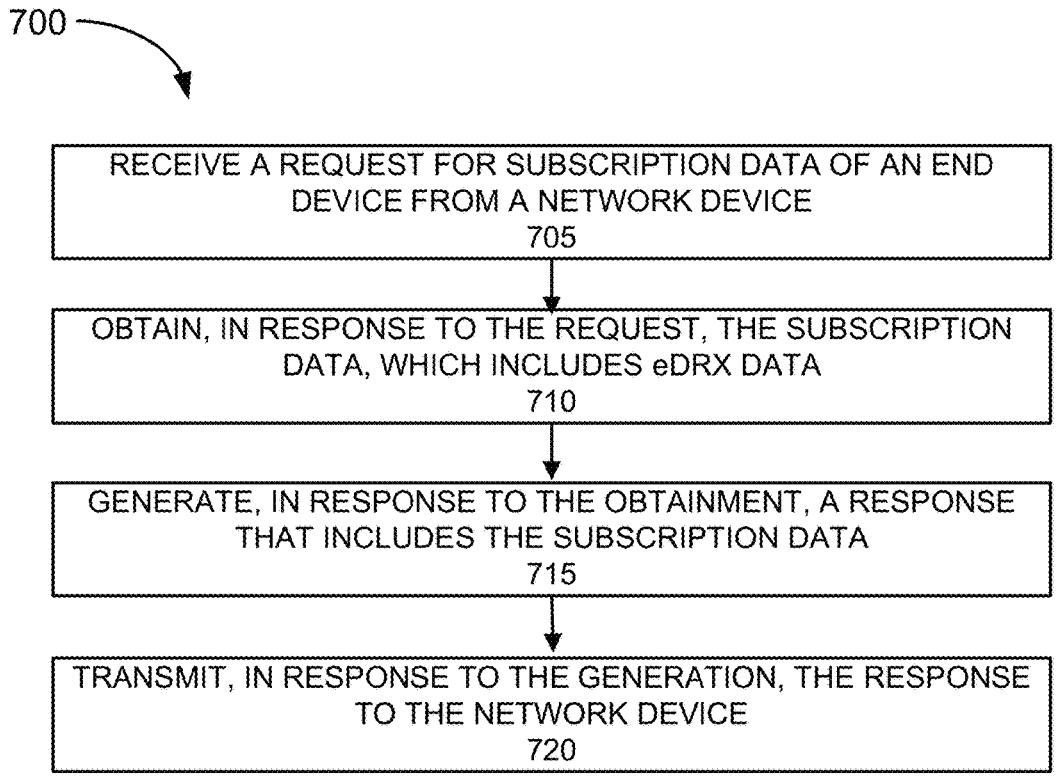
FIG. 7 is a flow diagram illustrating yet another exemplary process of an exemplary embodiment of the eDRX service.

FIG. 7 is a flow diagram illustrating yet another exemplary process 700 of an exemplary embodiment of the eDRX service. Process 700 is directed to the process previously described with respect to FIG. 2A, as well as elsewhere in this description. According to an exemplary embodiment, HSS 135 performs the steps of process 700. According to other exemplary embodiments, another type of network device (e.g., USPF, HLR, EIR, UDM device, etc.) that stores subscription data and/or end device profile data may perform the steps of process 700. According to an exemplary embodiment, processor 410 executes software 420 to perform the steps illustrated in FIG. 7, and described herein.

According to an exemplary embodiment, the network device described in process 700 is MME 130. According to other exemplary embodiments, the network device is another type of network device (e.g., AMF, SGSN, etc.) that manages eDRX support for end device 160.

Referring to FIG. 7, in block 705, a request for subscription data of an end device is received from a network device. For example, HSS 135 receives a request for subscription data of end device 160 from MME 130. The request may be implemented as an Attach request or another type of request for subscription data.

In block 710, in response to the receipt of the request, the subscription data, which includes eDRX data, is obtained. For example, HSS 135 performs a lookup of the subscription data of end device 160. HSS 135 may use an identifier pertaining to a user and/or end device 160 to retrieve the subscription data during the lookup. The subscription data includes eDRX data, as described herein.

In block 715, in response to the obtainment of the subscription data, a response that includes the subscription data is generated. For example, HSS 135 generates a response that includes the obtained subscription data of end device 160.

In block 720, in response to the generation of the response, the response is transmitted to the network device. For example, HSS 135 transmits the response to MME 130.

Although FIG. 7 illustrates an exemplary process of the eDRX service, according to other embodiments, process 700 may include additional operations, fewer operations, and/or different operations than those illustrated in FIG. 7, and described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive. For example, although the foregoing description of the authentication service may be implemented to authenticate IoT devices, the authentication service may be implemented to authenticate an end device other than an IoT device (e.g., a non-IoT device).

The words "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is intended to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 5-7, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., processor 410 and software 420). The embodiments have been described without reference to the specific software code since the software code can be designed to implement the embodiments based on the description herein and commercially available software design environments and/or languages.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 410) of a computational device. A non-transitory storage medium includes one or more of the storage mediums described in relation to memory/storage 415.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method comprising:
   receiving, by a network device from an end device, a first request pertaining to an attachment procedure;
   obtaining, by the network device, from an other network device, in response to the receiving, subscription data of the end device, wherein the subscription data includes extended discontinuous reception (eDRX) data that indicates to use an eDRX timer value that is based on a type of end device, a type of radio access technology (RAT), and a type of end device application;
   storing, by the network device in response to the obtaining, the subscription data;
   selecting, by the network device in response to the storing, the eDRX timer value;
   generating, by the network device in response to the selecting, a first response that includes the eDRX timer value; and
   transmitting, by the network device to the end device in response to the generating, the first response.

2. The method of claim 1, wherein the obtaining comprises:
   transmitting, by the network device to the other network device, a second request; and
   receiving, by the network device from the other network device, a second response that includes the subscription data.

3. The method of claim 2, wherein the network device is a mobility management entity (MME), and the other network device is a home subscriber server (HSS).

4. The method of claim 1, wherein the first request includes an attach request pertaining to the attachment procedure of a wireless network.

5. The method of claim 1, wherein the eDRX timer value has a range that includes a start eDRX timer value and an end eDRX timer value.

6. The method of claim 5, wherein the first request includes a first eDRX timer value, and wherein the selecting comprises:
   determining, by the network device, whether the first eDRX timer value falls within the range of the eDRX timer value; and
   changing, by the network device, the first eDRX timer value to the eDRX timer value in response to determining that the first eDRX timer value does not fall within the range of the eDRX timer value indicated by the eDRX data.

7. The method of claim 1, further comprising:
   receiving, by the network device from the end device, a second request, wherein the second request is received subsequent to the transmitting and includes tracking area update data;
   selecting, by the network device in response to the receiving of the second request, the eDRX timer value;
   generating, by the network device, a second response that includes the eDRX timer value; and
   transmitting, by the network device to the end device, the second response.

8. The method of claim 1, wherein the type of end device application includes an access point name.

9. A network device comprising:
   a communication interface;
   a memory, wherein the memory stores instructions; and
   a processor, wherein the processor executes the instructions to:
      receive, via the communication interface from an end device, a first request pertaining to an attachment procedure;
      obtain, from an other network device, in response to the receipt of the first request, subscription data of the end device, wherein the subscription data includes extended discontinuous reception (eDRX) data that indicates to use an eDRX timer value that is based on a type of end device, a type of radio access technology (RAT), and a type of end device application;
      store, in response to the obtainment, the subscription data;
      select, in response to the storage, the eDRX timer value;
      generate, in response to the selection, a first response that includes the eDRX timer value; and
      transmit, via the communication interface to the end device in response to the generation, the first response.

10. The network device of claim 9, wherein, when obtaining, the processor further executes the instructions to:
    transmit, via the communication interface to the other network device, a second request; and
    receive, via the communication interface from the other network device, a second response that includes the subscription data.

11. The network device of claim 10, wherein the network device is a mobility management entity (MME), and the other network device is a home subscriber server (HSS), and wherein the first request includes an attach request pertaining to the attachment procedure of a wireless network.

12. The network device of claim 9, wherein the eDRX timer value has a range that includes a start eDRX timer value and an end eDRX timer value.

13. The network device of claim 12, wherein the first request includes a first eDRX timer value, and wherein, when selecting, the processor further executes the instructions to:
    determine whether the first eDRX timer value falls within the range of the eDRX timer value; and
    change the first eDRX timer value to the eDRX timer value in response to a determination that the first eDRX timer value does not fall within the range of the eDRX timer value indicated by the eDRX data.

14. The network device of claim 9, wherein the processor further executes the instructions to:
    receive, via the communication interface from the end device, a second request, wherein the second request is received subsequent to the transmission of the first response and includes tracking area update data;
    select, in response to the receipt of the second request, the eDRX timer value;
    generate a second response that includes the eDRX timer value; and
    transmit, via the communication interface to the end device, the second response.

15. The network device of claim 9, wherein the type of end device application includes an access point name.

16. A non-transitory, computer-readable storage medium storing instructions executable by a processor of a device, which when executed cause the device to:
- receive, from an end device, a first request pertaining to an attachment procedure;
- obtain, from an other device, in response to the receipt of the first request, subscription data of the end device, wherein the subscription data includes extended discontinuous reception (eDRX) data that indicates to use an eDRX timer value that is based on a type of end device, a type of radio access technology (RAT), and a type of end device application;
- store, in response to the obtainment, the subscription data;
- select, in response to the storage, the eDRX timer value;
- generate, in response to the selection, a first response that includes the eDRX timer value; and
- transmit, to the end device in response to the generation, the first response.

17. The non-transitory, computer-readable storage medium of claim 16, wherein the eDRX timer value has a range that includes a start eDRX timer value and an end eDRX timer value.

18. The non-transitory, computer-readable storage medium of claim 16, wherein the instructions to obtain comprise further instructions executable by the processor of the device, which when executed cause the device to:
- transmit, to the other device, a second request; and
- receive, from the other device, a second response that includes the subscription data.

19. The non-transitory, computer-readable storage medium of claim 18, wherein the device is a mobility management entity (MME), and the other device is a home subscriber server (HSS), and wherein the first request includes an attach request pertaining to the attachment procedure of a wireless network.

20. The non-transitory, computer-readable storage medium of claim 16, further storing instructions executable by the processor of the device, which when executed cause the device to:
- receive, from the end device, a second request, wherein the second request is received subsequent to the transmission of the first response and includes tracking area update data;
- select, in response to the receipt of the second request, the eDRX timer value;
- generate a second response that includes the eDRX timer value; and
- transmit, to the end device, the second response.

* * * * *